UNITED STATES PATENT OFFICE.

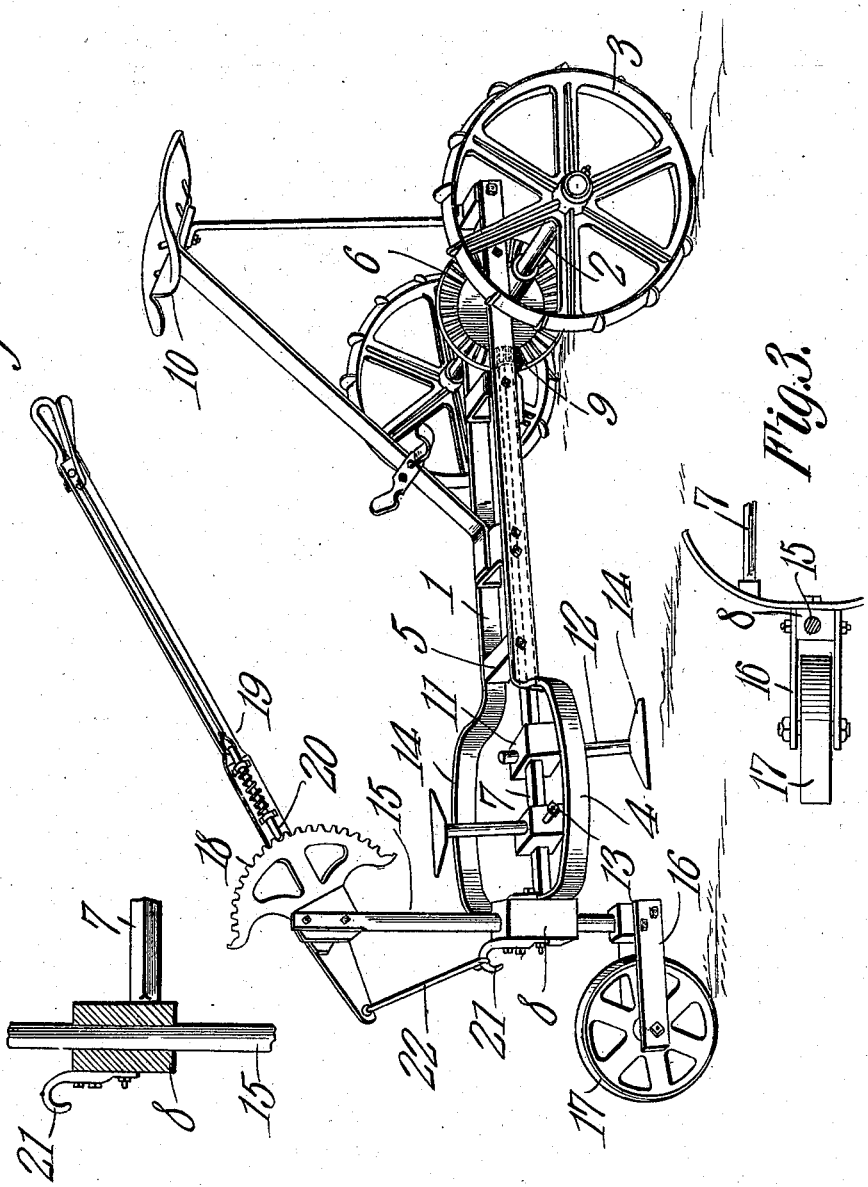

HARDY P. MIZELL, OF WAXAHACHIE, TEXAS.

COTTON-CHOPPER.

No. 873,255.      Specification of Letters Patent.      Patented Dec. 10, 1907.

Application filed July 31, 1907. Serial No. 386,397.

*To all whom it may concern:*

Be it known that I, HARDY P. MIZELL, a citizen of the United States, residing at Waxahachie, in the county of Ellis and State of Texas, have invented a new and useful Cotton-Chopper, of which the following is a specification.

This invention has relation to cotton choppers and it consists in the novel construction and arrangement of its parts as hereinafter shown and described.

The object of the invention is to provide a cotton chopper having blades adapted to rotate transversely of the row of plants and which is provided with means for guiding the same to a nicety along the row of plants and for regulating the depth at which the blades will cut while the implement is in operation.

In the accompanying drawing:—Figure 1 is a perspective view of the cotton chopper. Fig. 2 is a detail sectional view of a forward portion of the same, and Fig. 3 is a top plan view of the forward portion of the chopper.

The chopper consists of the frame 1 the rear portion of which is supported upon the axle 2 which is provided with the traction wheels 3. The forward side portions of the frame 1 are outwardly and oppositely bowed as at 4, and the frame 1 is provided at intervals throughout its length with the bearing blocks 5. The beveled gear wheel 6 is fixed to the axle 2 and rotates with the same. The shaft 7 is journaled in the bearing blocks 5 and also to the forward end of the frame 1. The beveled pinion 9 is fixed to the rear end of the shaft 7 and meshes with the gear wheel 6. The seat 10 is mounted upon the frame 1 in such position that the weight of the occupant thereof will come substantially over the axle 2. The blocks 11 are located on the shaft 7 and the arms 12 are secured to the said blocks by means of the set screws 13. Thus the said arms may be adjusted longitudinally through the blocks 11. The arms 12 are provided with the cutting blades 14. The arms 12 operate through the bowed portions 4 of the frame 1. The block 8 is attached to the forward end of the frame 1 to one side of the shaft 7. The shaft 15 passes vertically through the block 8 and is slidably mounted therein. The bracket 16 is attached to the lower end of the shaft 15 and the ground wheel 17 is journaled in the bracket 16. The gear segment 18 is fixed to the upper end of the shaft 15 and the ratchet lever 19 is fulcrumed to the side of the segment 18 and its ratchet 20 is adapted to engage the gear teeth of the said segment. The working end of the lever 19 is connected by means of a link 22 with a hook 21 mounted upon the block 8. The power end of the lever 19 is located within convenient reach of one who occupies the seat 10.

From the foregoing description it is obvious that as the chopper is being drawn along a row of plants the shaft 7 is rotated through the instrumentality of the axle 2, traction wheels 3 and gear wheels 6 and 9. Thus the blades 14 are rotated about an axis and chop out sections of the row of plants. The implement can be guided to a nicety along the row of plants by the operator, who, in guiding the implement will swing the lever 19 laterally. While the implement is in motion the depth at which the blades 14 may enter the ground may also be regulated by the operator who will swing the lever 19 vertically. Thus the forward portion of the frame 1 is raised or lowered by means of the link 22 and hook 21 attached to the block 8. Thus the rear portion of the machine is maintained at a constant or uniform distance from the surface of the ground while the forward portion thereof is moved vertically with relation to the ground. This movement also compensates for any unevenness in the surface of the soil and may be resorted to for the purpose of causing the blades to pass over obstructions.

Having described my invention what I claim as new and desire to secure by Letters-Patent is:—

An implement as described comprising a frame having at its forward ends oppositely and laterally bowed portions, wheels supporting the rear end of the frame, a journaled shaft mounted upon the frame and extending longitudinally thereof, means operatively connecting the shaft with said wheels, choppers mounted upon the shaft and operating between the bowed portion of the frame, a bearing block mounted upon the forward end of the frame and to one side of the shaft, a shaft slidably journaled in said bearing block, a ground wheel attached to the lower end of the last said shaft and a lever mechanism attached to the upper end of the last said shaft.

In testimony that I claim the foregoing as my own, I have hereto affixed my signature in the presence of two witnesses.

HARDY P. MIZELL.

Witnesses:
    JAMES E. RIDDLE,
    TOM BURLESON.